Patented June 2, 1953

2,640,816

UNITED STATES PATENT OFFICE 2,640,816

PREPARATION OF SOLUTIONS OF POLYVINYL ALCOHOL-ACETATE

Leo M. Germain, Shawinigan Falls, Quebec, Canada, assignor to Shawinigan Chemicals Limited, Montreal, Quebec, Canada, a corporation of Canada No Drawing. Application May 3, 1952,
Serial No. 286,015

2 Claims. (Cl. 260—29.6)

This invention relates to the production of water-soluble or water-dispersible polyvinyl alcohol-acetate resins and a process of using the resins for splicing paper.

Most of the prior art methods of making polyvinyl alcohol or alcohol-acetate from polyvinyl acetate produce the product in a reaction medium in which it is insoluble. In U. S. Patent No. 2,341,398, Strother, where the product remains in solution, none of the examples show more than 30% of the ester groups removed from the polyvinyl acetate; this corresponds to 82% polyvinyl acetate by weight in the polyvinyl alcohol-acetate.

The prior art is unanimous in indicating the desirability of anhydrous conditions or quite small amounts of water in carrying out alcoholysis (i. e. reaction with alcohol in the presence of acid or of relatively small amounts of alkaline catalyst). Herrmann et al., in U. S. Patent 2,109,883 state "A small amount of water present does not affect the reaction, but as the amount of water increases the specific advantages of the new process are gradually diminished." Berg in U. S. Patent 2,227,997 states "Water exerts an inhibiting effect upon the hydrolysis reaction" (alcoholysis by the terminology of this application), and "the reaction may be interrupted at the desired stage of conversion by neutralizing the catalyst or by the addition of water to the reaction mixture." Strother et al. in U. S. Patent 2,341,398 carry out the acid alcoholysis under substantially anhydrous conditions. Roberts et al. in British Patent 563,991 use "a relatively small proportion of water" in their provisional specification; in their complete specification they set the limit of water broadly "in amount 1–10% of the total weight of liquid," but in their examples they use a maximum of 3% of water based on the total methanol and water.

In contrast, large amounts of water were used in alkaline saponification by Noller in U. S. Patent 1,897,856; the alkali used in the example was 134% of the stoichiometric equivalent of the polyvinyl acetate.

It has now been found that polyvinyl alcohol-acetate resins containing at least 45% by weight of polyvinyl acetate can be prepared by the alcoholysis with methanol of polyvinyl acetate in the presence of excess methanol, an alkaline alcoholysis catalyst, and relatively large amounts of water, usually in the range from 12% to 20% by weight of all the methanol and water. A smal proportion, preferably under 20%, of the excess methanol can be replaced by methyl acetate; larger proportions of methyl acetate are objectionable because of greatly increased catalyst requirements for the same final resin composition. The combination of water, methanol, and methyl acetate is a solvent for the polyvinyl alcohol-acetate so that the product of the reaction is a homogeneous solution. The presence of these large amounts of water makes it necessary to use larger amounts of catalyst, to obtain the same final composition of polyvinyl acetate in the alcohol-acetate, than are required in the processes using the usual small proportions of water or none. However, in some respects, this is a decided advantage, for in the presence of these large amounts of water the destruction of the catalyst by reaction with the methyl acetate produced by the alcoholysis reaction and that originally present, if any, is greatly accelerated and thus the total reaction time is greatly reduced. The amounts of catalyst required remain far below those necessary for saponification, being not more than 15% of the stoichiometric equivalent of the original polyvinyl acetate. The reaction may be conveniently carried out at between 10° C. and 40° C., preferably between 20° C. and 30° C.

The process is illustrated by the following example:

Five hundred and fifty grams of polyvinyl acetate of 7 centipoises viscosity were dissolved in 450 grams of methanol and 115 grams of water. As a catalyst solution, 25 grams of sodium hydroxide were dissolved in 1000 cc. (790 grams) of methanol. Over a period of 15 minutes the solutions, at room temperature, were blended by pumping them once, at rates of 50 grams and 17½ grams per minute respectively, through a small but effective mixer; the blended effluent from the mixer was collected in a storage vessel without stirring. Fifteen minutes later the alcoholysis reaction had stopped due to the destruction of the catalyst by its reaction with the methyl acetate produced during alcoholysis. The partially hydrolyzed polyvinyl acetate (polyvinyl acetate-alcohol) thus produced contained 61% of polyvinyl acetate by weight, and remained in solution. By dilution with 27 grams of glycerine and 74 grams of water a solution of about 25% non-volatiles was produced. This was cast on a moving belt and dried to give a film about one mil thick. Part of the film was slit to a width of ¾ inch and wound on a reel interleaved with paper. (End of example.)

These polyvinyl alcohol-acetate resins are useful as adhesives particularly when made available in the form of thin films by casting resin by any of the known methods from the homogeneous solution in which it is prepared. Thermo-plastic or heat-sealable adhesive films are well known and have been used for example for splicing newsprint or other papers in the paper industry in order to wind continuous rolls direct from the rewinder. All such films now available for this purpose are non-water-dispersible, so that when scrap paper containing a splice made of such films is returned to the beater, the film breaks down into relatively large discrete pieces which cause defects in the paper made from the beater stock.

It has now been found that films from these resins containing between 45% and 65% by weight of polyvinyl acetate and made from polyvinyl acetate of viscosity within the range from 4 to 20 centipoises are particularly valuable for this purpose. These films should also contain a water-soluble plasticizer containing at least one OH group per molecule, for example, glycerine, monacetin, diacetin, glycol, or water itself. A suitable amount is 8% to 30% by weight of the film. It should be noted that material of this composition is not water-soluble in the strict sense of the term, (except perhaps that in the lower range of acetate content), but it disperses readily in water at any temperature to give a mobile slime. Hence, when scrap paper, spliced with a film of it, is returned to the beater, no discrete particles of the film remain to cause defects in paper made from the beater stock.

Such films can be used in splicing paper by any of the known methods, for example, that described by Freeman and Morin in the Pulp and Paper Magazine of Canada, Convention Issue, 1937, pages 168–169.

The viscosity of polyvinyl acetate as used in this specification refers to the viscosity in centipoises of a molar benzene solution at 20° C.

This application is a continuation-in-part of my copending application Serial No. 152,003 filed March 25, 1950.

What is claimed is:

1. A process for the preparation of a solution of polyvinyl alcohol-acetate resin, said resin containing at least 45% by weight of polyvinyl acetate comprising the reaction, in solution, of polyvinyl acetate with methanol in the presence of excess methanol, an alkaline alcoholysis catalyst not exceeding 15% of the stoichiometric equivalent of the original polyvinyl acetate, and water in an amount between 12% and 20% by weight of all the methanol and water.

2. A process according to claim 1, wherein the original solution containing excess methanol contains also a proportion of methyl acetate not exceeding 20% by weight of the excess methanol, the amount of said water being calculated on the total of water and methanol only.

LEO M. GERMAIN.

References Cited in the file of this patent

UNITED STATES PATENTS

| Number | Name | Date |
|---|---|---|
| 1,897,856 | Noller | Feb. 14, 1933 |
| 2,467,774 | Plambeck | Apr. 19, 1949 |

FOREIGN PATENTS

| Number | Country | Date |
|---|---|---|
| 563,991 | Great Britain | Sept. 7, 1944 |